Figure 1:
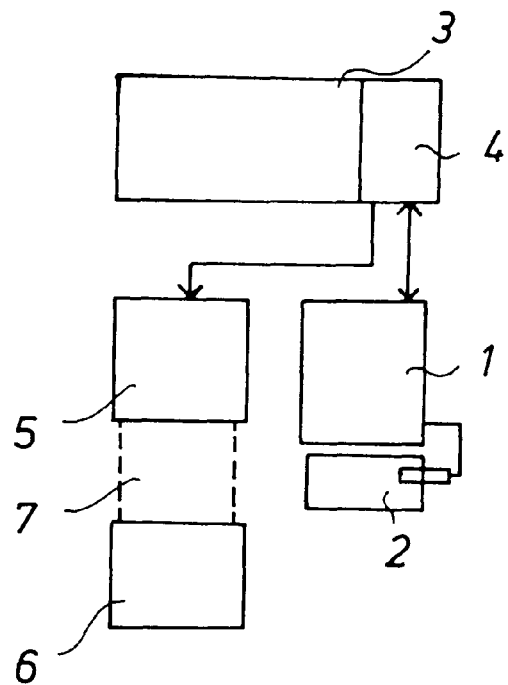

United States Patent [19]
Vinck

[11] Patent Number: 6,016,208
[45] Date of Patent: Jan. 18, 2000

[54] DATA PROVIDING METHOD

[75] Inventor: Paul Walter Vinck, Hove, Belgium

[73] Assignee: AGFA-Gevaert, N.V., Mortsel, Belgium

[21] Appl. No.: 07/688,288

[22] Filed: Apr. 22, 1991

[30] Foreign Application Priority Data

Apr. 26, 1990 [BE] Belgium ............................ 90201042

[51] Int. Cl.$^7$ .................................................. H04N 1/40
[52] U.S. Cl. ........................... 358/448; 358/401; 358/296
[58] Field of Search ..................... 358/400, 401,
358/406, 442, 443, 444, 445, 448, 449,
468, 75, 80, 296; 356/445, 446, 448; 395/129,
132; 382/47, 61

[56] References Cited

U.S. PATENT DOCUMENTS 5,010,398  4/1991  Nys et al. ................................ 358/80

*Primary Examiner*—Thomas D. Lee
*Attorney, Agent, or Firm*—Breiner & Breiner

[57] ABSTRACT

A method of providing data (more particularly non-density data) to a data-processing apparatus such as a computer or a workstation or the like and a user interface to be used in connection with such a data-processing apparatus.

10 Claims, 1 Drawing Sheet

DATA PROVIDING METHOD

BACKGROUND OF THE INVENTION

1. Field of the Invention

The present invention relates to a method of providing data (more particularly non-density data) to a data-processing apparatus such as a computer or a workstation or the like and to a user interface to be used in connection with such a data-processing apparatus. Further, the invention relates to such a user interface for use in a pre-press page composition system or image reproduction system.

2. Description of the State of the Art

State of the art systems by means of which a user communicates with data processing systems, i.e. by means of which the user inputs data into the system or informs the system of certain commands, commonly comprise a keyboard or a digitizing tablet or a so-called "mouse" or a "rollerball" etc.

For certain applications and for certain users the existing user interfaces have proven not to be entirely satisfactory.

For example, adverse reaction against systems in which interfacing is obtained through use of a keyboard was shown by users who were not familiar with machine-writing.

OBJECT OF THE INVENTION

It is an object of the present invention to provide a method of providing data to a data processing apparatus and to provide a user interface that have an improved performance regarding convenience.

It is a further object to provide a user interface to be used in connection with a graphic reproduction system.

Further objects will become apparent from the description hereinbelow.

SUMMARY OF THE INVENTION

The present invention provides a method of providing non-density data to a data-processing system characterised in that a relation between said non-density data and corresponding preset density values is determined and stored in said data-processing system and that density values are fed into said data-processing system to provide the corresponding non-density data.

By "non-density data" in the present invention is meant all kinds of "information" to be fed into the data-processing apparatus, such as numerical data, and also "commands", for example commands for controlling a device.

According to a specific embodiment of the method of the present invention, said density value(s) is(are) measured on at least one density varying pattern to which said data or commands are linked.

In a preferred embodiment said density varying pattern is a photographic reflection or transmission wedge. To different densities on the wedge different numerical values of certain data or different commands are linked.

The density varying pattern can be black-and-white or coloured.

It will be obvious that, in addition to the above-mentioned non-density data, also density data can be communicated to the data-processing system.

The invention furthermore comprises an apparatus for carrying out the above method.

This apparatus comprises a data processing system and a so-called modelboard. A modelboard comprises at least one density varying pattern, to different densities on the density varying pattern different data are linked.

The relation is stored in the storage unit of a data processing system, for example in a look up table.

The density values on the "modelboard" are measured by means of a densitometer that is electronically coupled to the data-processing system (via an electronic interface).

An electric signal corresponding to a measured density value is applied to the data processing system.

Preferably the density varying pattern(s) take(s) the form of a photographic wedge (continuous tone or halftone wedge). To different locations on the wedge having different density values, different numerical values of a certain quantity (for example a length or an amount) can be linked.

In another embodiment the density varying pattern can have the form of a colour varying pattern.

The above modelboard can be used in several applications. Its design can be adapted to the specific application in which it is used.

A particular embodiment of the device of the present invention has been designed for use in reprographic or graphic applications.

In graphic or reprographic applications images to be reproduced or to be used in pre-press page composition can be transformed into a digital representation for subsequent subjection to image processing such as copying, cropping, resizing, screening, descreening, manipulating etc.

This task can for example be performed by means of a graphic scanner such as a flatbed CCD scanner in which a document or image to be digitized is scanned by means of a light source and in which the image-wise reflected or transmitted light is directed to an opto-electronic sensor such as a CCD sensor for conversion into an electric analog representation that may be digitized subsequently.

The image may be subjected to image processing e.g. in a raster image processor before being fed to a recorder for example a phototypesetter. The recorded image can then be used for the production of a printing plate. Other recording apparatus, for example, a laser printer, may be envisioned.

Entering data and commands can be performed by means of a workstation. The area of the image to be scanned and digitized, the desired image-processing operations, the minimum and maximum density etc. can be inputted into the reproducing system through use of a user interface according to the present invention that is coupled to the workstation.

Preferably the user interface is specifically designed for this application.

In a particular embodiment the image reproducing device may be provided with a processor for processing the recorded image, for example in those cases when the image is recorded onto photographic material.

A user interface according to the present invention can be used in other applications. For example locations having different densities may be linked to different numerical values and to different arithmetical operations. By measuring density values and feeding the measured values into a workstation that is provided with a look up table comprising the links of the measured values with the numericals and with the operations, an interface suitable for a calculator can be provided.

Embodiments

Figure 2:
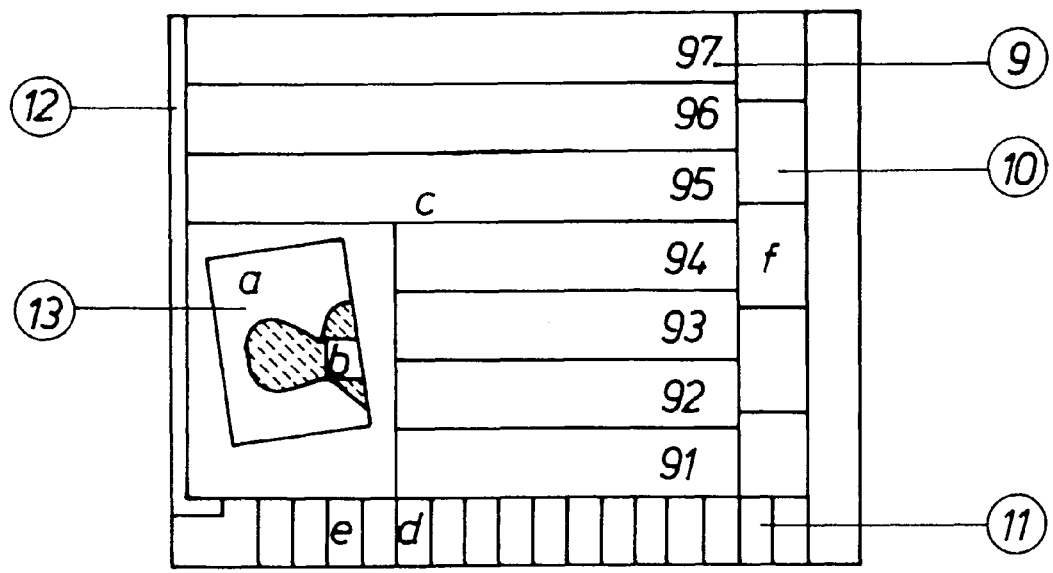

Particular embodiments of the present invention will be described hereinbelow with reference to the accompanying drawings in which:

FIG. 1 is a schematic representation of an image reproducing device in which a modelboard according to the present invention can be used, FIG. 2 is a schematic representation of a modelboard designed for use in a graphic reproduction device.

In FIG. 1 an electronic equivalent of a reproduction camera (image reproduction device) is schematically shown. The system comprises the following components: a workstation 1 to enter parameters and to control the system, a flatbed CCD scanner 3 to capture images and transform the images into a digital representation, a raster image processor 4 for applying image-processing onto the captured image, a phototypesetter 5 to expose photographic film or paper in correspondence with the information of the digital representation and that will be used in a further stadium to produce a printing plate and optionally an online film or paper processor 6 in which said exposed photographic film or paper can be developed. Optionally an on-line bridge 7 for transporting recording material from the recorder to the processor may be provided. Communication of the user with the workstation 1 is performed through the user interface 2.

FIG. 2 illustrates an example of an embodiment of a modelboard part of a user interface according to the present invention. The modelboard has been specifically designed to be used in combination with the data-processing apparatus of FIG. 1.

The modelboard comprises a first vertical photographical stepper wedge 9 having a density variation (each step 91 to 97 has a width of 5 mm) from white to black. To this stepper wedge the width to be scanned on the original is linked. The scan width varies for example from 0 mm to 300 mm. Further, the modelboard comprises a second vertical stepper wedge 10 that is linked to the number of columns to be set on the type setter. The model board further comprises a horizontal wedge 11 linked to the ratio of the scan height to the minimum height to be set on the phototypesetter. The relations between the density data and non-density data are stored in the data-processing system.

When using this modelboard, an original 13 to be scanned is positioned along the left border 12 of the modelboard. By means of a reflection densitometer that is connected via a serial interface to a workstation for example a APPLE MACINTOSH workstation, the following values are measured and fed into the workstation:

measurement a: maximum density to be reproduced (between density 0 and density 2), measurement b: minimum density to be reproduced (between density 0 and density 2), measurement c: scanwidth (between 0 and 300 mm), measurement d: scanheight (between 5 and 420 mm), measurement e: number of columns to be set on the typesetter or measurement f: height to be set on the typesetter (between 5 and 420 mm).

Other parameters can be linked to different density values: for example parameters concerning the type of original, concerning the procesvariables such as unsharp reproduction, gradation etc. and parameters concerning the output and specifications of certain commands. Conversion from the measured density values to the linked parameter is performed in the workstation.

I claim:

1. A method of identifying non-density data in a data processing system comprising determining a relation between non-density data and corresponding preset density values, storing said relation between non-density data and preset density values in a data processing system and feeding said density values into said data processing system to identify the corresponding non-density data.

2. A method according to claim 1 wherein said density value(s) is(are) measured on at least one density varying pattern to which said non-density data are linked.

3. A method according to claim 2 wherein said density varying pattern is a photographic reflection or transmission wedge.

4. A method according to claim 2 wherein said pattern is a color varying pattern.

5. An apparatus comprising a data processing section, a storage unit in which a look-up table comprising a relation of non-density data and corresponding density values has been stored, a user interface having at least one density varying pattern, a densitometer, and an electronical interface interconnecting said densitometer and said data processing section.

6. A graphic reproduction apparatus comprising a scanner for scanning and digitizing an image, an image processor for subjecting the scanned image to image-processing, a recorder for recording a digitized and/or processed image onto a recording material, a work station for entering data, wherein said work station comprises a storage unit in which a look-up table comprising a relation of said data and corresponding density values has been stored, and a user interface having at least one density varying pattern, and a densitometer connected through an electronical interface to said work station.

7. An apparatus according to claim 6 wherein said recording device is a phototypesetter for recording said digitized and/or processed image onto photographic material.

8. An apparatus according to claim 7 provided with a processor for processing said photographic material onto which said image has been recorded.

9. An apparatus according to claim 8 wherein said density varying pattern comprises a photographic reflection or transmission wedge.

10. An apparatus according to claim 8 wherein said pattern comprises a color varying pattern.

* * * * *